July 6, 1954   E. J. SCHAEFER   2,683,228
ELECTRIC MOTOR SHAFT AND BEARING CONSTRUCTION
Filed March 12, 1953
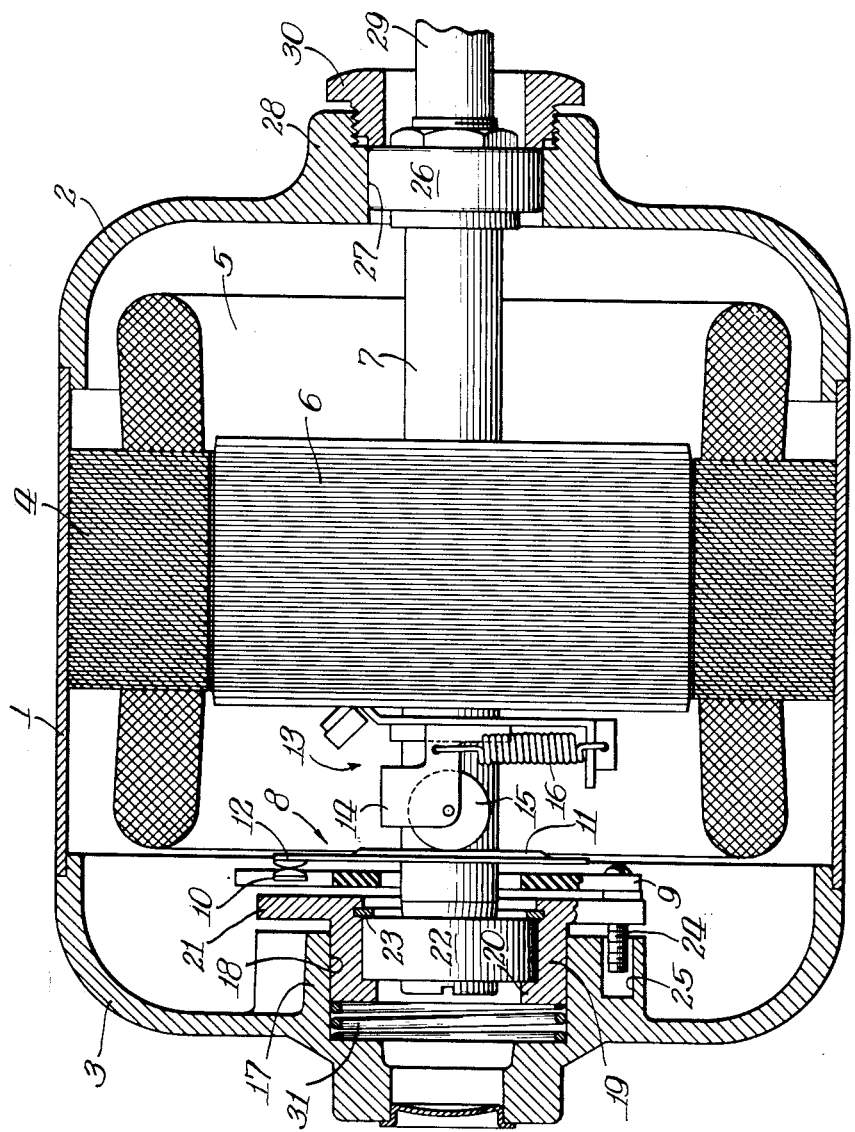
INVENTOR.
Edward J. Schaefer,
BY
Davis Lindsey Hibben & Noyes
Attys.

Patented July 6, 1954

2,683,228

UNITED STATES PATENT OFFICE 2,683,228

ELECTRIC MOTOR SHAFT AND BEARING CONSTRUCTION

Edward J. Schaefer, Fort Wayne, Ind.

Application March 12, 1953, Serial No. 341,925

10 Claims. (Cl. 310—69)

This invention relates to improvements in electric motors and more particularly to a novel rotor shaft and bearing construction for an electric motor having a centrifugally operated switch for cutting out the starting winding of the motor.

Single phase electric motors are usually provided with a centrifugal switch mechanism for the purpose of disconnecting or cutting out the starting winding of the motor after the motor has reached a predetermined speed. During starting of the motor the starting winding is connected in circuit with a running winding so as to obtain a high torque during starting and at low running speed of the motor. However, after the motor has reached a predetermined speed, the starting winding can be disconnected by means of the centrifugally operated switch mechanism and the motor thereafter operates only on the running winding.

At the present time, the most satisfactory and economical centrifugal switch mechanisms are of the type comprising a stationary switch means and a rotating actuating means spaced axially from the switch means. The switch means is usually rigidly mounted on the motor frame or housing and includes a pair of contacts adapted to be opened and closed by operation of the actuating means. The actuating means comprises a centrifugally responsive device carried rigidly on the rotor shaft of the motor for rotation therewith. When the motor is operating below a predetermined speed, the actuating device is in axial operating engagement with the switch means so that the switch contacts are closed. When this predetermined operating speed is exceeded, centrifugal force acting on the actuating device causes a shift in the position of the latter so that the switch contacts are opened to disconnect the starting winding from the motor circuit. It will also be understood that a centrifugal switch mechanism of the foregoing type may also be used for other purposes to connect or disconnect any electrical circuit in response to increases and decreases of motor speed. However, for purposes of the present invention the important point is that such centrifugal switch mechanisms are highly sensitive to the relative axial positions of the stationary switch means and the rotating actuating device. In other words, in the construction of the motor the stationary and rotating parts of the centrifugal switch mechanism are arranged in a certain predetermined operating relation axially of the rotor shaft and for proper operation of the switch mechanism this relationship must not be disturbed.

I have found that in certain uses of electric motors of this type it is desirable to provide for a limited degree of axial adjustment of the rotor shaft of the motor. For example, a pump impeller is frequently mounted directly on the motor shaft or an extension thereof and it is sometimes necessary or desirable to have an axial adjustment for the pump impeller in order to meet different operating requirements of the pump. Heretofore, it has not been possible to provide for convenient axial adjustment of the rotor shaft of an electric motor of the foregoing type because even a slight change in axial position of the rotor shaft would completely disrupt the predetermined operating relation between the stationary part of the centrifugal switch mechanism mounted in fixed relation on the motor housing and the rotating part of the switch mechanism carried on the rotor shaft.

Accordingly, a primary object of my invention is to provide a novel rotor shaft and bearing construction for electric motors which overcomes the disadvantages and limitations of the arrangements heretofore used.

A further object of the invention is to provide a novel and convenient means for axial adjustment of a motor shaft from the exterior of the motor without disassembling any part of the motor.

Another object of the invention is to provide a novel means for permitting axial adjustment of the rotor shaft of an electric motor without disturbing the normal operation of the centrifugal switch mechanism of the motor.

An additional object of the invention is to provide a novel bearing mounting for the rotor shaft of an electric motor of the type having a centrifugal switch mechanism with axially engageable operating parts whereby to permit axial adjustment of the rotor shaft without disturbing the normal operating relation between the parts of the switch mechanism.

Other objects and advantages of the invention will become apparent from the subsequent detailed description taken in conjunction with the accompanying drawing which is an axial sectional view through an electric motor embodying one specific form of my invention.

Referring to the drawing, the electric motor illustrated therein is of the single phase type having a housing including a central tubular section 1 and a pair of end bells 2 and 3 defining the opposite axial ends of the motor housing or frame. The usual laminated stator core 4 having stator windings 5 is mounted in the central housing portion 1, and a rotor 6 is disposed within the bore of the stator and is mounted on a rotor shaft 7.

The motor is provided with a centrifugal switch mechanism of the type described in my U. S. Patent No. 2,516,922. Inasmuch as the particular details of the centrifugal switch mechanism are not important for purposes of the present invention, a brief description of the switch will suffice. Thus, the switch mechanism includes a stationary part or switch means 8 having an insulated base 9 carrying a contact 10, and a movable resilient member 11 carrying a contact 12 for generally axial movement into and out of engagement with the contact 10. By means hereinafter described, the base 9 of the stationary switch means 8 is rigidly mounted and held against rotation. The centrifugal switch mechanism also includes an actuating means or device 13 which is rigidly carried on the shaft 7 for rotation therewith. The actuating device comprises a weighted pivoted member 14 carrying a rotatable rider 15 adapted to bear against the movable switch member 11. During low speed operation of the motor the member 14 is held in the position indicated in the drawing by the action of a spring means 16 so that the engagement of the rider 15 with the movable switch member 11 holds the switch contacts 10 and 12 in closed position whereby the starting winding of the motor is connected in the motor circuit. However, when the motor exceeds a certain predetermined speed, centrifugal force causes the weighted pivot member 14 to swing outwardly against the action of spring means 16 whereby to disrupt the engagement of the rider 15 with the switch member 11. The switch member 11 is of resilient spring-like construction and when the rider 15 is disengaged therefrom it automatically moves axially to break the electrical contact between the contact members 12 and 10 thereby cutting out the starting winding of the motor.

From the foregoing brief description of the operation of the centrifugal switch mechanism, it will be understood that the operating parts of the switch undergo more or less axial engagement and disengagement so that proper operation of the switch depends entirely upon the maintenance of a predetermined operating position between the switch means 8 and the actuating device 13 axially of the shaft 7. If the predetermined spaced relation between the stationary and rotating parts of the switch is disturbed, obviously the switch will not function in the manner intended.

In order to permit limited axial adjustment of the rotor shaft 7 without interfering with the operating relation between the parts 8 and 13 of the switch mechanism, I provide a special means for mounting the stationary switch part and one of the shaft bearings. Thus, the end bell 3 of the motor housing is provided with an inwardly extending circular portion 17 having a recess 18. In this recess 18 an auxiliary housing member or bearing support 19 is slidably mounted for axial movement. The bearing support 19 is in the form of an annular sleeve having an inwardly turned lip 20 at its outer end and a radially extending flange portion 21 at its inner end, the flange 21 overlying the inner axial end of the housing portion 17. An anti-friction bearing unit 22 of a conventional type comprising an inner race rigidly affixed to the shaft 7 and an outer race with anti-friction bearing elements therebetween is rigidly carried in the sleeve portion of the slidable support 19. As seen in the drawing, the outer race of the bearing 22 abuts the inturned lip 20 and is clamped thereagainst by means of a retaining ring 23 seated in the bearing support 19 and engaging the opposite axial end of the bearing 22. Thus, there is a substantially rigid connection between the shaft 7, the bearing unit 22, and the slidable bearing support 19 so that all of these parts are movable axially as a unit by reason of the sliding relation of the bearing support 19 in the recess 18. In other words, the support 19 is held against axial movement relative to the shaft 7 but the shaft is free to rotate relative to the support 19.

In order to maintain the desired axially spaced operating relation between the switch parts 8 and 13, the insulated base portion 9 of the stationary switch means 8 is rigidly carried on the flange portion 21 of the bearing support 19, the base 9 being secured to the flange by means of one or more screws 24. In order to prevent rotation of the switch part 8, and also the bearing support 19, at least one of the switch mounting screws 24 extends at its inner end into an axial bore or opening 25 provided in the end wall of the annular housing portion 17. Thus, the screw 24 coacts with the stationary housing to insure non-rotatable mounting of the bearing support 19 and the switch part 8 but at the same time permits axial shifting movement of these parts relative to the motor housing.

At the opposite end of the rotor shaft 7 a bearing unit 26 is likewise carried on the shaft and has an axially slidable fit in a bore 27 of a hub portion 28 provided by the end bell 2. An extension 29 projects from the end of the rotor shaft 7 for connection to a pump or other device to be operated by the motor. For effecting axial adjustment of the rotor shaft 7, I provide an adjusting nut 30 having a threaded connection in the end of the hub portion 28 and axially engaging the bearing unit 26. A helical compression spring 31 is disposed at the base of the recess 18 at the opposite end of the motor and coacts between the motor housing and the slidable bearing support 19 for normally urging the rotor shaft in a right-hand direction as seen in the drawing. It will be understood that by manipulation of the adjusting nut 30, the shaft 7 can be moved to a limited degree in either direction and the adjustment can be made easily from the exterior of the motor without any need for disassembly.

As the rotor shaft 7 is shifted axially by the combined action of the adjusting nut 30 and the spring 31, it will be understood that the bearing support 19, the bearing unit 22, and both parts 8 and 13 of the switch mechanism are likewise shifted in unison with the shaft 7 so that the initial predetermined operating relation between the switch parts 8 and 13 is never disturbed. Consequently, the invention lends itself readily to use in those situations where axial adjustment of the rotor shaft is desirable.

Although the invention has been described in connection with a specific structural embodiment, it will be understood that various modifications and equivalent structures may be resorted to without departing from the scope of the invention as defined in the appended claims.

I claim:

1. In an electric motor, the combination of a motor housing, a rotor shaft adjustable axially of said housing, a centrifugal switch mechanism including a rotating part mounted on said shaft for rotation therewith and a stationary part disposed in predetermined operating position relative to said rotating part, and support means mounted in said housing in axially slidable relation therewith and held against rotation relative to said housing, said stationary part being rigidly mounted on said supporting means and said supporting means being held against axial movement relative to said shaft whereby to permit axial adjustment of the shaft in the housing while maintaining the predetermined operating relation between said parts.

2. In an electric motor, the combination of a motor housing, a rotor shaft adjustable axially of said housing, a centrifugal switch mechanism including a rotating part mounted on said shaft for rotation therewith and a stationary part disposed in predetermined operating position relative to said rotating part, and supporting means mounted in said housing in axially slidable relation therewith and having said stationary part rigidly mounted thereon, said supporting means carrying said shaft and being held against axial movement relative thereto whereby the operating relation between said parts is maintained on axial adjustment of said shaft.

3. In an electric motor, the combination of an axially adjustable rotor shaft, a centrifugal switch mechanism including a rotating part mounted on said shaft for rotation therewith and a stationary part disposed in predetermined operating position relative to said rotating part, bearing means at one end of said shaft, and a non-rotatable axially movable support carrying said bearing means and said stationary part, said support being shiftable axially with said shaft and said bearing means whereby to permit axial adjustment of the shaft without disturbing the operating relation between said parts.

4. In an electric motor, the combination of a motor housing, a rotor shaft adjustable axially of said housing, a centrifugal switch mechanism including a rotating part mounted on said shaft for rotation therewith and a stationary part disposed in predetermined operating relation with said rotating part axially of said shaft, bearing means carried at the opposite ends of said shaft, the bearing means at one end of the shaft being supported by said housing in axially slidable relation therein, and a movable support for the other bearing means at the opposite end of said shaft, said support being slidably mounted in said housing for axial movement with said shaft and said other bearing means and having said stationary part rigidly mounted thereon whereby to permit axial adjustment of said shaft without disturbing the operating relation between said parts.

5. In an electric motor, the combination of a motor housing, a rotor shaft adjustable axially of said housing, a centrifugal switch mechanism including a rotating part mounted on said shaft for rotation therewith and a stationary part disposed in predetermined operating relation with said rotating part axially of said shaft, bearing means affixed to one end of said shaft and slidably supported in said housing, bearing means affixed to the opposite end of said shaft, a support for said last mentioned bearing means slidably mounted in said housing for axial movement with said shaft and having said stationary part mounted thereon whereby to permit axial adjustment of the shaft without disturbing the operating relation between said parts, resilient means operatively coacting with one end of said shaft, and adjusting means operatively coacting with the other end of said shaft for moving the latter axially against the action of said resilient means.

6. In an electric motor, the combination of a motor housing, an axially adjustable rotor shaft disposed in said housing, a centrifugal switch mechanism including a rotating part mounted on said shaft for rotation therewith and a stationary part disposed in predetermined operating relation with said rotating part axially of said shaft, bearing means affixed to one end of said shaft and slidably mounted in one end of said housing, bearing means affixed to the opposite end of said shaft, an axially movable support for said last mentioned bearing means slidably mounted in the opposite end of said housing for axial movement with said shaft and carrying said stationary part whereby to permit axial adjustment of the shaft without disturbing the operating relation between said parts, a spring member coacting between said support and said opposite end of said housing for urging said shaft in one axial direction, and an adjusting nut threaded into said one end of said housing and coacting with said first mentioned bearing means for moving said shaft in the opposite axial direction against the action of said spring member.

7. In an electric motor, the combination of an axially adjustable rotor shaft, a centrifugal switch mechanism including a rotating part mounted on said shaft for rotation therewith and a stationary part disposed in predetermined operating position relative to said rotating part, an anti-friction bearing unit at one end of said shaft including an inner race affixed to the shaft and an outer race with a plurality of anti-friction bearing elements therebetween, and an annular bearing support having said outer race rigidly seated therein, said bearing support being shiftable axially with said shaft and said bearing unit and having said stationary part rigidly mounted thereon whereby to permit axial adjustment of said shaft without disturbing the operating relation between said parts.

8. In an electric motor, the combination of an axially adjustable rotor shaft, a centrifugal switch mechanism including an actuating means mounted on said shaft for rotation therewith and a stationary switch means disposed in predetermined operating position axially of said actuating means, said switch means being rendered operative and inoperative in response to axial engagement and disengagement by said actuating means, bearing means at one end of said shaft, and a non-rotatable axially movable support carrying said bearing means and said stationary switch means, said support being shiftable axially with said shaft and said bearing means whereby to permit axial adjustment of the shaft without disturbing the operative relation between said switch means and said actuating means.

9. In an electric motor, the combination of a motor housing, an axially adjustable rotor shaft, a centrifugal switch mechanism including a rotating part mounted on said shaft for rotation therewith and a stationary part disposed in predetermined operating position relative to said rotating part, bearing means at one end of said shaft, an axially movable support carrying said bearing means and said stationary part, said support being shiftable axially with said shaft and said bearing means whereby to permit axial adjustment of the shaft without disturbing the operating relation between said parts, and means coacting between said support and said housing for preventing rotation of said support and said stationary part.

10. In an electric motor, the combination of a motor housing, an axially adjustable rotor shaft disposed in said housing, a centrifugal switch mechanism including a rotating part mounted on said shaft for rotation therewith and a stationary part disposed in predetermined operating position relative to said rotating part, bearing means affixed to one end of said shaft, and an annular sleeve member having a radially extending flange portion and slidably mounted in said housing for axial movement, said bearing means being seated in said sleeve member for axial shifting movement of the sleeve member with said bearing means and said shaft whereby to permit axial adjustment of the latter without disturbing the operating relation between said parts, and said stationary part being affixed to said flange portion of the sleeve member by means of a plurality of screws and at least one of said screws extending axially from said flange portion into said housing for preventing rotation of said sleeve member and said stationary part.

No references cited.